US005864626A

United States Patent [19]

Braun et al.

[11] Patent Number: 5,864,626

[45] Date of Patent: Jan. 26, 1999

[54] MULTI-SPEAKER STORYTELLING SYSTEM

[76] Inventors: Ori Braun; Shirley Braun, both of Boyar 12/7, 69127 Tel Aviv, Israel

[21] Appl. No.: 798,407

[22] Filed: Feb. 7, 1997

[51] Int. Cl.[6] .......................... H04B 3/00

[52] U.S. Cl. .......................... 381/81; 381/79; 381/2; 381/80; 455/89

[58] Field of Search .......................... 381/1, 2, 24, 77, 381/80, 81; 455/89, 90, 49.1, 35.1, 38.1, 38.2, 51.2; 446/297, 397

[56] References Cited

U.S. PATENT DOCUMENTS

| | | |
|---|---|---|
| 2,009,337 | 7/1935 | Brewer . |
| 2,247,329 | 10/1941 | Deitz . |
| 4,840,602 | 6/1989 | Rose . |
| 4,857,030 | 8/1989 | Rose . |
| 5,074,821 | 12/1991 | McKeefery et al. . |
| 5,085,610 | 2/1992 | Engel et al. . |
| 5,108,341 | 4/1992 | DeSmet . |
| 5,347,306 | 9/1994 | Nitta . |
| 5,648,999 | 7/1997 | Easterling .......................... 446/297 |

*Primary Examiner*—Minsun Oh Harvey
*Attorney, Agent, or Firm*—Mark M. Friedman

[57] ABSTRACT

A storytelling system in which a base unit broadcasts some blocks of audio data stored therein, and transmits other blocks of audio data stored therein to remote units for remote broadcast. Transmission to the remote units may be as radio signals, as ultrasound signals, as infrared signals, or as electrical impulses transmitted along wires. The blocks of data include identification codes to indicate which units are to broadcast them. The remote units have unique identifying features and are covered by matching dolls representing characters of the story. Each remote unit broadcasts the audio data appropriate to its own doll.

22 Claims, 10 Drawing Sheets

MULTI-SPEAKER STORYTELLING SYSTEM

FIELD AND BACKGROUND OF THE INVENTION

The present invention relates to a storytelling system and, more particularly, to a system in which audio data are transmitted to one or more "talking dolls", which translate the audio data into audible sound.

Extant audio storytelling systems are characterized by either extreme simplicity or a certain degree of complexity. At one end of the spectrum, there are audio cassette players, and variations thereof. At the other end, there are systems of talking dolls of varying degrees of complexity. Talking dolls have been elaborated in one of two ways. The first, more common way has been to animate the dolls, as described, for example, in U.S. Pat. No. 5,108,341 of DeSmet. The second has been to provide systems of dolls that interact intelligently, as described, for example, in U.S. Pat. Nos. 4,840,602 and 4,857,030 of Rose. Each of Rose's dolls is a miniature robot, equipped with a central processing unit, a read only memory for vocabulary, and a speech synthesizer. Each doll is capable of initiatin and maintaining a simulated conversation with the other dolls of the system. Rose justifies the complexity of his system as being necessary to maintain the interest of young children, and cites a study by "a child development specialist in the Pediatrics Department of a West Coast hospital" in support of his thesis. In that study, young children were found to become quickly bored with the limited repertoire of non-interactive talking dolls.

Neither animation nor interactivity is necessary to maintain the interest of young children. For ages, mothers and teachers have held the interest of children with classical fairy tales, with no need for technological gimmicks. Furthermore, the more elaborate prior art systems tend to be priced beyond the limited means of many young families. There is thus a widely recognized need for, and it would be highly advantageous to have, a storytelling system in which the story is narrated, at least in part, by talking dolls of less complexity and cost than those of the prior art.

SUMMARY OF THE INVENTION

According to the present invention there is provided a storytelling system comprising: (a) a data storage medium, whereon is stored a plurality of blocks of audio data, each of the blocks of audio data being flagged with an identification code; (b) a transmission mechanism for transmitting the blocks of audio data; (c) at least one remote unit, featuring a mechanism for receiving the transmitted blocks of audio data and broadcasting the blocks of audio data as audible sound; and (d) a selection mechanism for selecting one of the at least one remote unit to broadcast at least one of the blocks of audio data, in accordance with the identification code.

The present invention includes a base unit that broadcasts part of a recording of a story via its own audio speaker and transmits the rest of the story to remote units shaped like characters of the story. The remote units take turns broadcasting their own parts of the story via their own audio speakers. Typically, the base unit recites narrative, and each remote unit recites dialog corresponding to the character that it represents. The remote units also can broadcast together, for example, in pairs. All that is needed to maintain the continued interest of young children in an inanimate storytelling system is a good story, such as one of the classical fairy tales, and an array of visually appealing talking dolls that recite the stored dialog of the story. Unlike the more elaborate prior art systems, the present invention stores the audio data only at the base unit. The dolls serve only as audio broadcasters. This makes the present invention simpler, more flexible and less expensive than the prior art systems.

According to the present invention, the base unit transmits the dolls' part of the story to the remote units via a suitable transmission medium, such as ultrasound, radio waves, infrared waves, or electrical impulses transmitted along wires connecting the base unit to the remote units.

Another feature of the present invention is that in its preferred embodiment, the outward appearances of the remote speakers are matched to the story. Each remote unit of a system according to the present invention has a unique identifying feature, such as a colored patch or a shape. The unit is paired with a doll that has a matching identifying feature. For example, each remote unit may have a unique shape, such as a cylinder of a particular (circular, polygonal, etc.) exterior cross section. To the unit is fitted a doll whose interior cross section matches that exterior cross section. The doll may be shaped to fit over the corresponding remote unit, or the remote unit may be shaped to fit in the back of the corresponding doll. In this way, different stories can be told using the same remote units but different, relatively inexpensive dolls. For example, a system with four remote units, of circular, square. rectangtular, and triangular cross section, can be used to tell the story of Goldilocks and the Three Bears using a Goldilocks doll with a circular interior cross section, a Papa Bear doll with a square interior cross section, a Mama Bear doll with a rectangular interior cross section, and a Baby Bear doll with a triangular interior cross section; and then used to tell the story of Little Red Riding Hood using a Little Red Riding Hood doll with a circular interior cross section, a Wolf doll with a square interior cross section, a Grandmother doll with a rectangular interior cross section, and a Huntsman doll with a triangular cross section.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a storytelling system which can be reconfigured differently for telling different stories.

Specifically, the present system can be used to entertain young children and hold their attention.

The principles and operation of a storytelling system according to the present invention may be better understood with reference to the drawings and the accompanying description.

Figure 1:
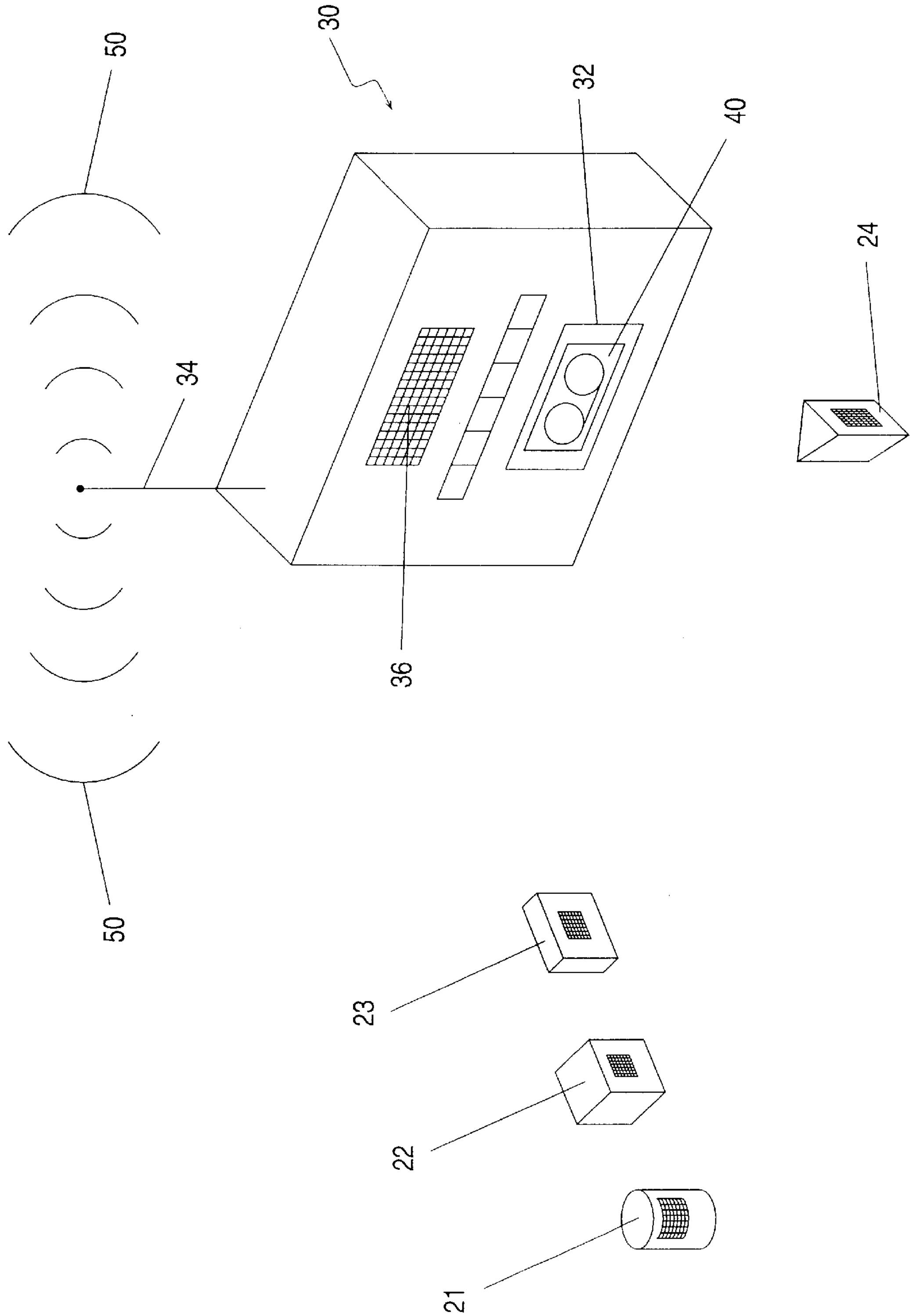
FIG. 1 is a perspective view of a storytelling system according to the present invention, with the dolls removed.

Referring now to the drawings, FIG. 1 is a perspective view of one preferred embodiment of the present invention. A story is stored on an audio cassette tape 40 and played on a cassette tape player 32 of a base unit 30. Part of the story is broadcast, as audible sound, substantially as stored on tape 40, via base audio speaker 36. Thhe rest of the story is broadcast by a transmitter in base unit 30 via a radio antenna 34 as a modulated radio signal 50 to four remote units 21, 22, 23, and 24. Remote units 21, 22, 23, and 24 are provided with radio receivers and audio speakers. Each block of audio data is provided with an identification code that identifies the unit or units, either base unit 30 or one or more of the remote units, that is to broadcast it. When base unit 30 reads a block of audio data including an identification code that associates that block of audio data with base unit 30, base unit 30 broadcasts that block of audio data. When a remote unit receives a block of audio data including an identification code that associates that block of audio data with that remote unit, then that remote unit broadcasts the dialog substantially as stored on tape 40.

Figure 2:
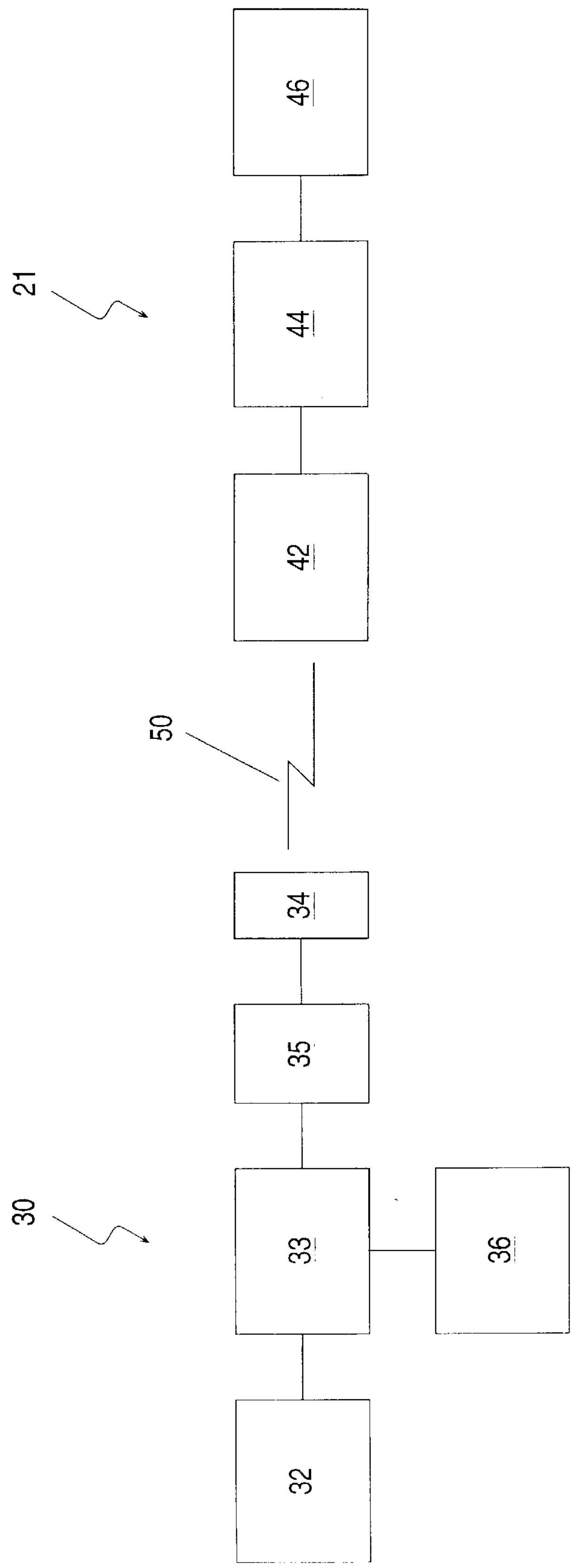
FIG. 2 is a block diagram of the system of FIG. 1.

FIG. 2 is a block diagram of base unit 30 and, by way of example only, remote unit 21, it being understood that, apart from external shape, and, in most embodiments, apart from a locally stored unique identity code, remote units 21, 22, 23 and 24 are substantially identical. Blocks of audio data from cassette tape player 32 are sent to circuitry 33 that reads the identification code of each block. A block having an identification code associating it with base unit 30 is broadcast by speaker 36. A block having an identification code associating it with a remote unit is broadcast by a radio transmitter 35 via antenna 34, and received by a radio receiver 42 in each of the remote units. If circuitry 44 in a remote unit recognizes an identification code in the signal that corresponds to that remote unit, then circuitry 44 broadcasts the block via an audio speaker 46.

Figure 3:
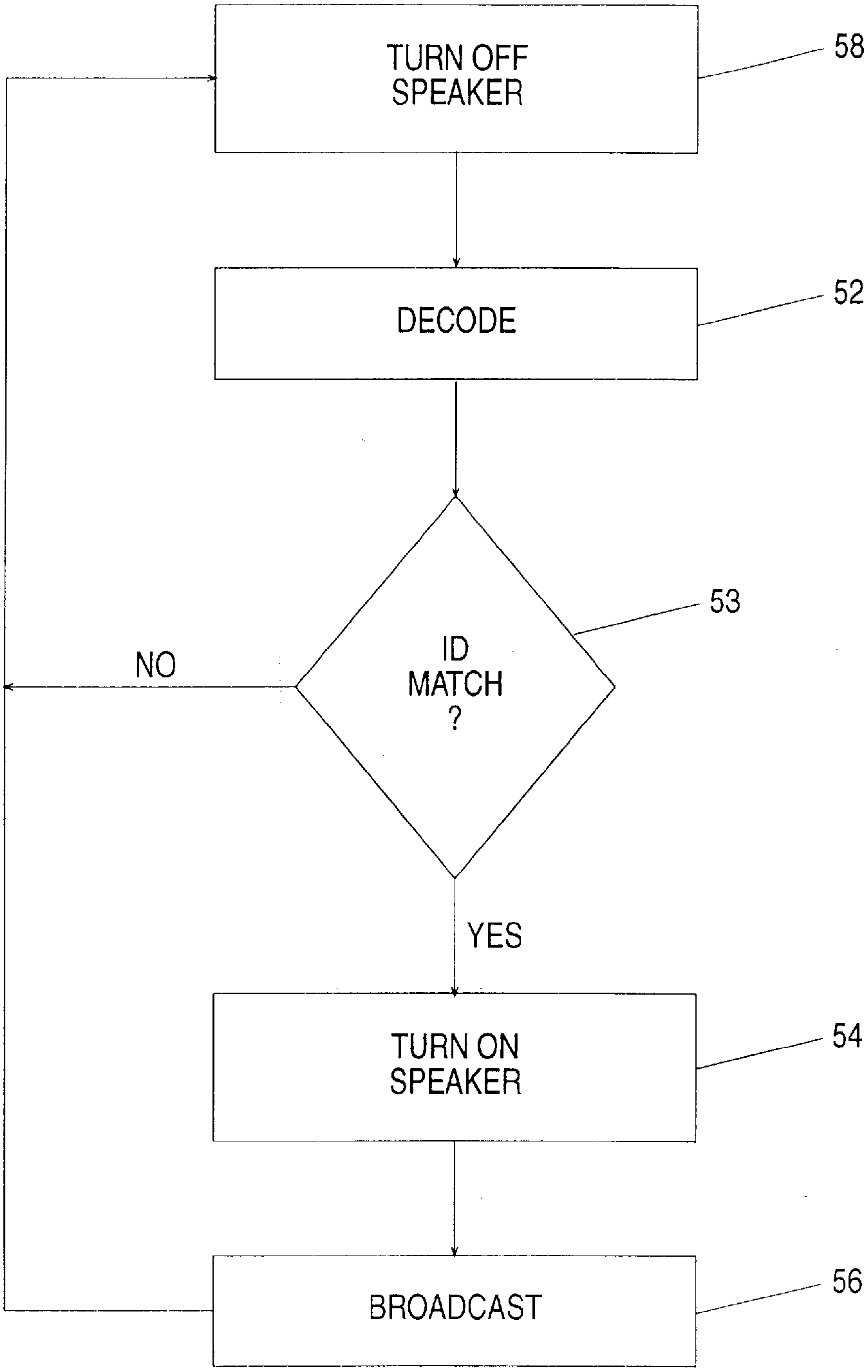
FIG. 3 is a flow diagram of the decoding and broadcast of a block of audio data.

FIG. 3 is a flow diagram showing in more detail one possible sequence of steps by which circuitry 44 broadcasts the correct blocks of dialog. Speaker 46 is initially off (block 58). In block 52, circuitry 44 decodes the incoming signal and identifies a block of audio data. In block 53, circuitry 44 compares the identification code of the audio data block with the remote unit's identity code. If the two codes match, then circuitry 44 turns on speaker 46 (block 54) and broadcasts the audio data (block 56). Otherwise, circuitry 44 turns off speaker 46 in block 58, and returns to block 52 to decode the next block of audio data. One way to configure speaker 46 to enable this sequence of steps is to put a switch in series with one of the input terminals of speaker 46. In block 54, circuitry 44 closes the switch. In block 58. circuitry 44 opens the switch.

The system of FIG. 1 may be configured so that the decoding of the identification code is performed either in base unit 30 or in remote units 21, 22, 23 and 24. For example, base unit 30 can be configured to decode the identification code and transmit the associated block of audio data to the proper remote unit at a unique frequency associated with that remote unit. In this way, several blocks can be transmitted simultaneously to several remote units, so that a system with four dolls can be configured to sign a four part round such as "Row Row Row Your Boat". Alternatively, audio blocks can be multiplexed by base unit 30 and transmitted in stereo, and received by two remote units using stereo receivers. Each of the two remote units then demultiplexes and broadcasts only one of the two stereo tracks.

Figure 4:
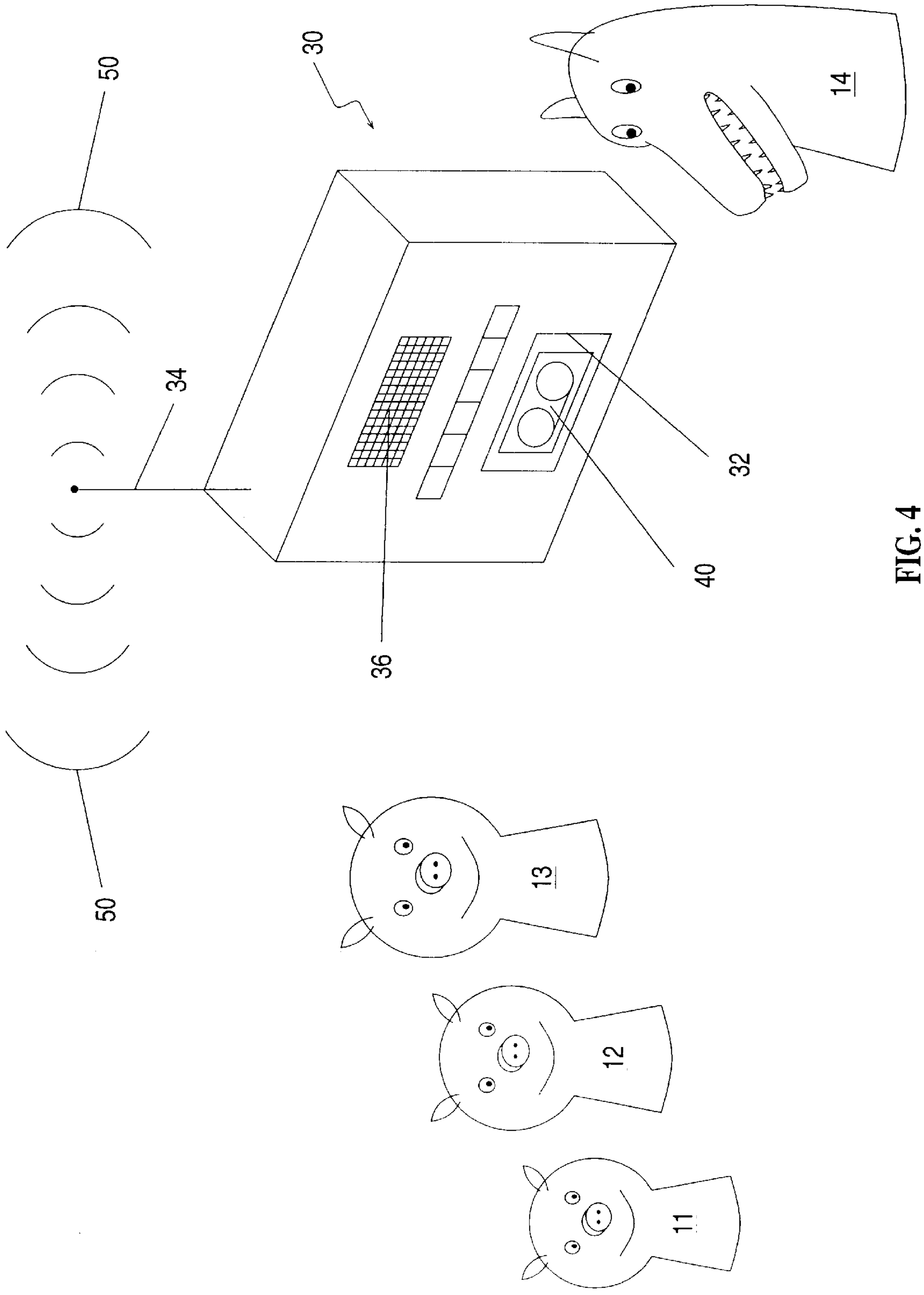
FIG. 4 is a perspective view of the system of FIG. 1 with the dolls in place.
Figure 5:
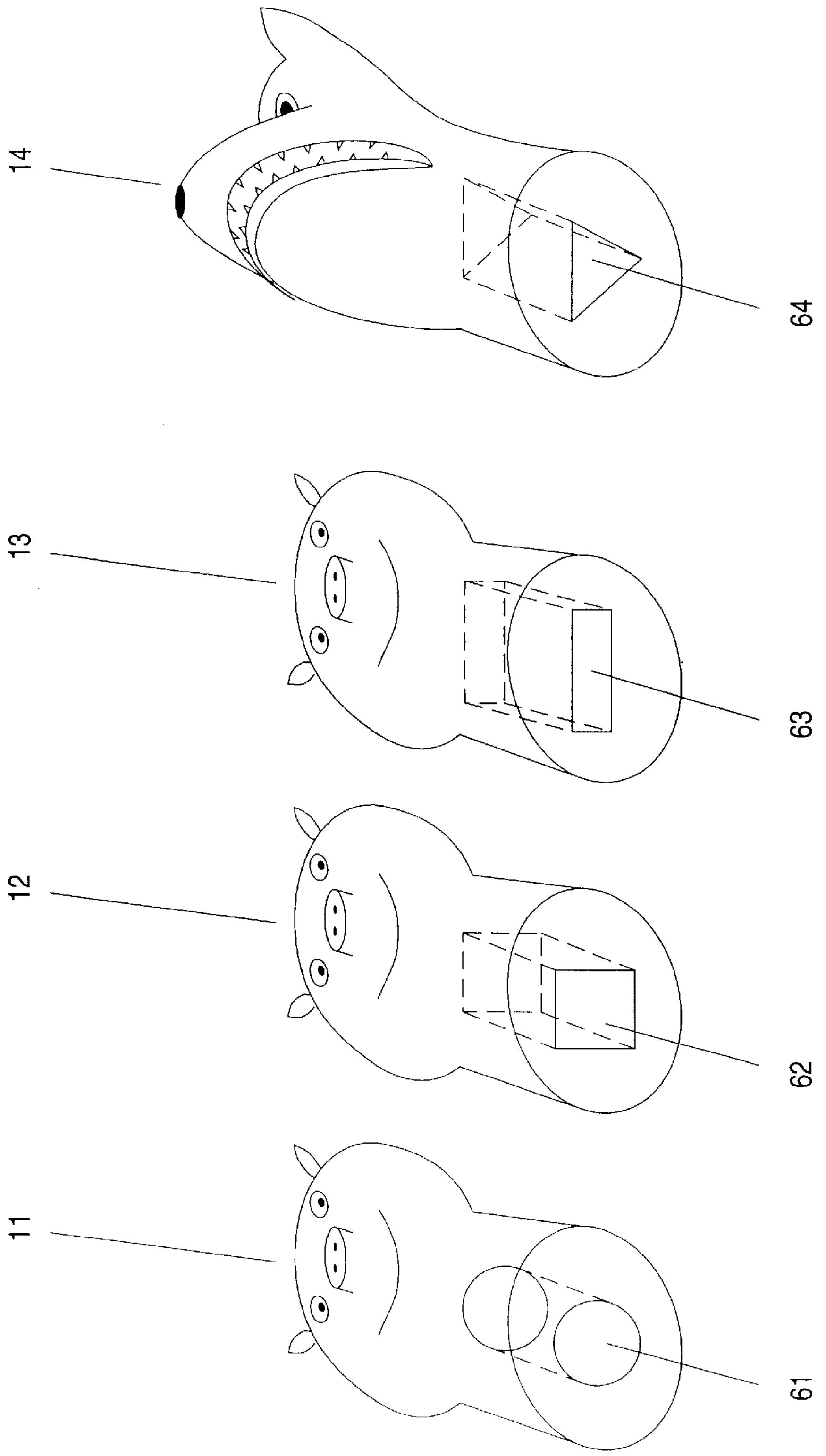
FIG. 5 is a perspective view of the dolls of FIG. 1 viewed from below.

FIG. 4 shows the system of FIG. 1, configured to tell the story of The Three Little Pigs. Remote units 21, 22, 23, and 24 are covered by dolls appropriate to the story: Remote unit 21 is covered by a First Little Pig doll 11; remote unit 22 is covered by a Second Little Pig doll 12: remote unit 23 is covered by a Third Little Pig doll 13; and remote unit 24 is covered by a Big Bad Wolf doll 14. As shown in FIG. 1, each remote unit has a unique shape: remote unit 21 is cylindrical; remote unit 22 is a square prism; remote unit 23 is a rectangular prism; and remote unit 24 is a triangular prism. The dolls are configured so that each doll fits on one and only one remote unit. As shown in FIG. 5, First Little Pig doll 11 is provided with a cylindrical cavity 61 having the dimensions of remote unit 21 and enabling First Little Pig doll 11 to fit only on remote unit 21; Second Little Pig doll 12 is provided with a square prismatic cavity 62 having the dimensions of remote unit 22 and enabling Second Little Pig doll 12 to fit only on remote unit 22; Third Little Pig doll 13 is provided with a rectangular prismatic cavity having the dimensions of remote unit 23 and enabling Third Little Pig doll 13 to fit only on remote unit 23; and Big Bad Wolf doll 14 is provided with a triangular prismatic cavity having the dimensions of remote unit 24 and enabling Big Bad Wolf doll 14 to fit only on remote unit 24.

Figure 6:
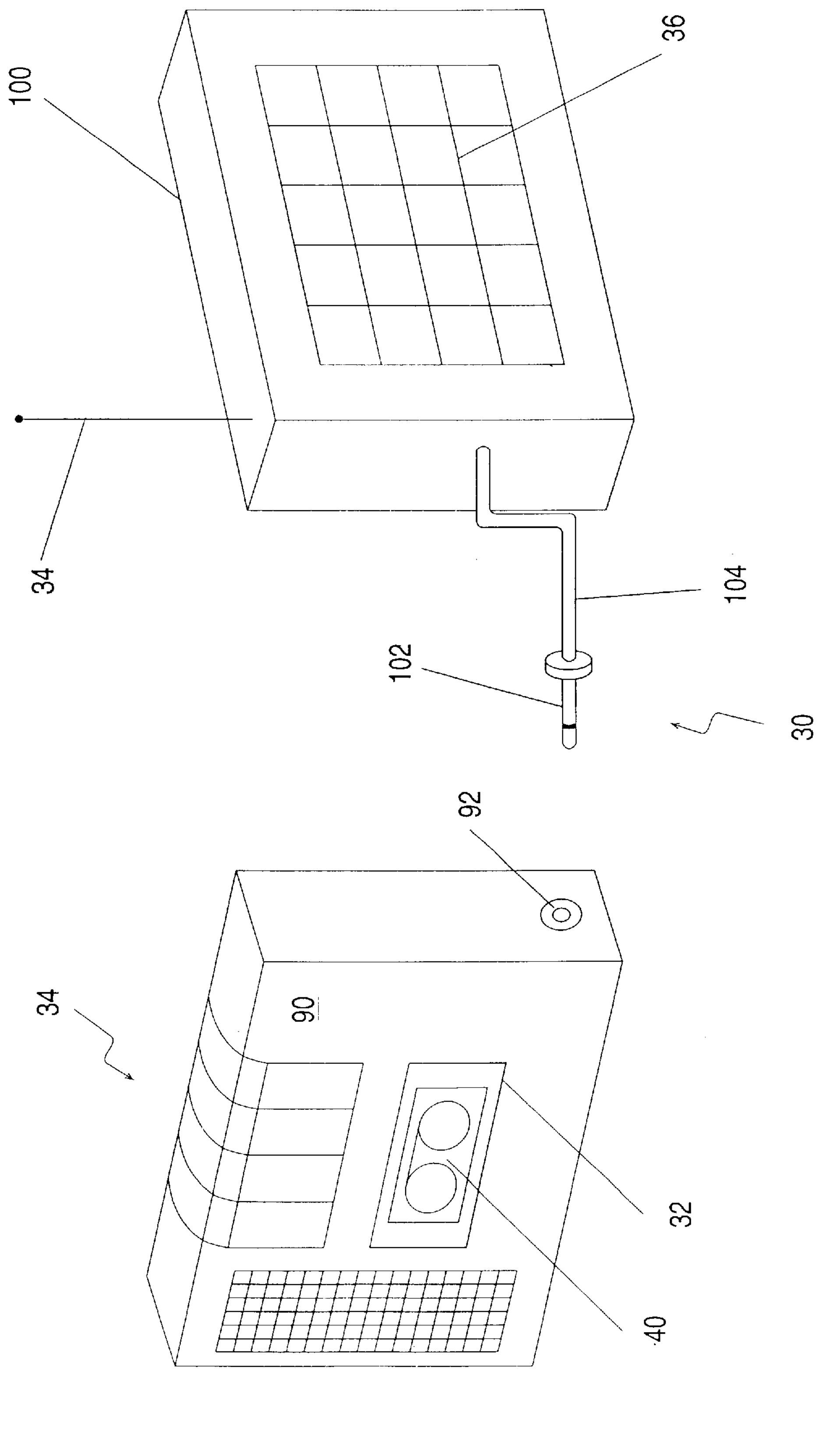
FIG. 6 is a perspective view of an alternative embodiment of the base unit of FIG. 1.

FIG. 6 shows an alternative embodiment of base unit 30. In this embodiment, one part of base unit 30 is a conventional audio tape recorder 90, configured with cassette tape player 32 for cassette tape 40, conventional tape recorder buttons 94 (play, record, stop, etc.), and a socket 92 into which a pair ofearphones may be plugged. The other part of unit 30 is a broadcaster/transmitter 100 including antenna 34, transmitter 35 (not shown) and speaker 36, and configured with a conventional mechanism 104, for example a pair of wires terminating in a plug 102, for establishing an electrical connection between tape recorder 90 and transmitter 100. Plug 102 is shaped in the usual way to fit into socket 92. Broadcaster/transmitter 100 receives signals from tape recorder 90 that would be transformed to audible signals by a pair of earphones, and transmits them via antenna 34. An advantage of this embodiment is that the inclusion of conventional tape recorder 90 reduces the cost of the system.

Although the preferred embodiment of the present invention shown in FIGS. 1 and 2 uses audio cassette tape 40 as the data storage medium of the story and audio cassette tape player 32 as the mechanism for reading the data storage medium, the scope of the present invention includes all suitable data storage media, for example compact disks, and all suitable mechanisms for reading the media, for example a compact disk player. Furthermore, the audio data broadcast by base unit 30 and the remote units need not be restricted to speech, such as narrative and dialog, but may include all appropriate forms of audio data, for example, music.

It also is to be understood that the description herein of the use of radio to tranismit encoded audio data to the remote units is illustrative only. The scope of the present invention includes any suitable transmission medium, including, infrared waves and ultrasound. The transmitted signal may be imposed on the carrier wave by any suitable modulation method, including amplitude modulation, frequency modulation and phase modulation. In the case of ultrasound transmission, for example, parts 34 and 35 in FIGS. 1, 2 and 6 should be understood to represent an ultrasound speaker rather than a radio transmitter and antenna, part 42 in FIG. 2 should be understood to represent an ultrasound receiver rather than a radio receiver; and part 50 in FIG. 1 should be understood to represent all ultrasound signal rather than a radio signal. Similarly, in the case of infrared transmission, parts 34 and 35 should be understood to represent an infrared transmitter, part 42 should be understood to represent an infrared receiver and part 50 should be understood to represent an infrared signal.

Preferably, in the case of ultrasound transmission, ultrasound signal 50 is a modulated carrier wave of suitably high frequency, for example 100 kilohertz. The frequency of the ultrasound carrier must be sufficiently high that enough bandwidth is available to transmit the encoded dialog blocks to the remote units. In the case of radio transmission, radio signal 50 preferably is a modulated carrier wave in the megahertz or gigahertz region of the radio spectrum. These frequencies are more than high enough to support the necessary bandwidth.

Figure 7:
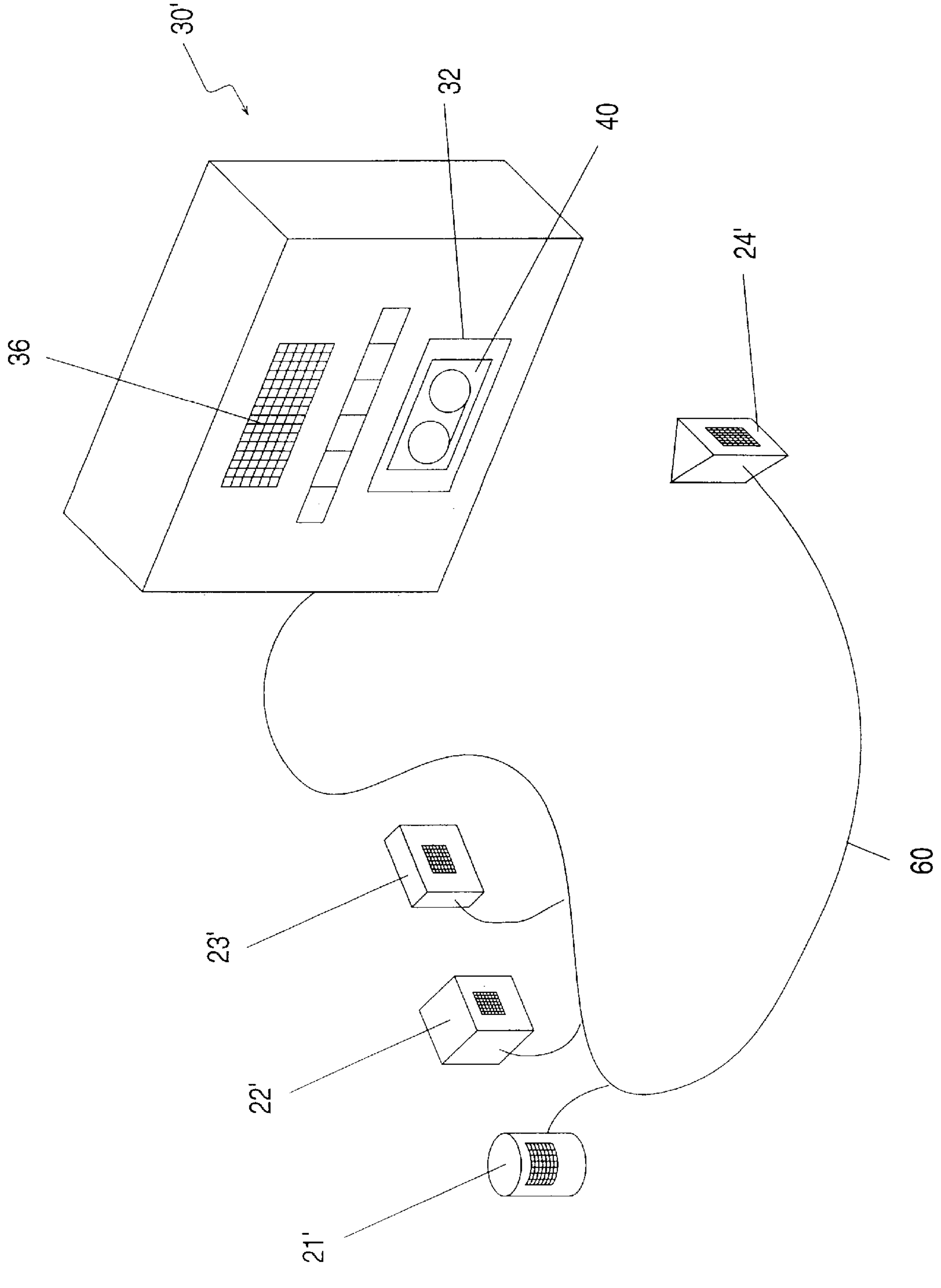
FIG. 7 is a perspective view of a second embodiment of the present invention.

FIG. 7 is a perspective view of a second preferred embodiment of the present invention. The difference between this embodiment and the embodiment of FIG. 1 is that in this embodiment, the audio blocks to be broadcast by remote units 21', 22', 23' and 24' are transmitted to them by a base unit 30' as electrical impulses along a hardwired communications line 60 which may be, for example, a twisted pair of telephone wires. In this embodiment, transmitter 35, antenna 34 and receivers 42 are not necessary: line 60 provides direct links between base unit circuitry 33 and remote unit circuitry 44.

Figure 8:
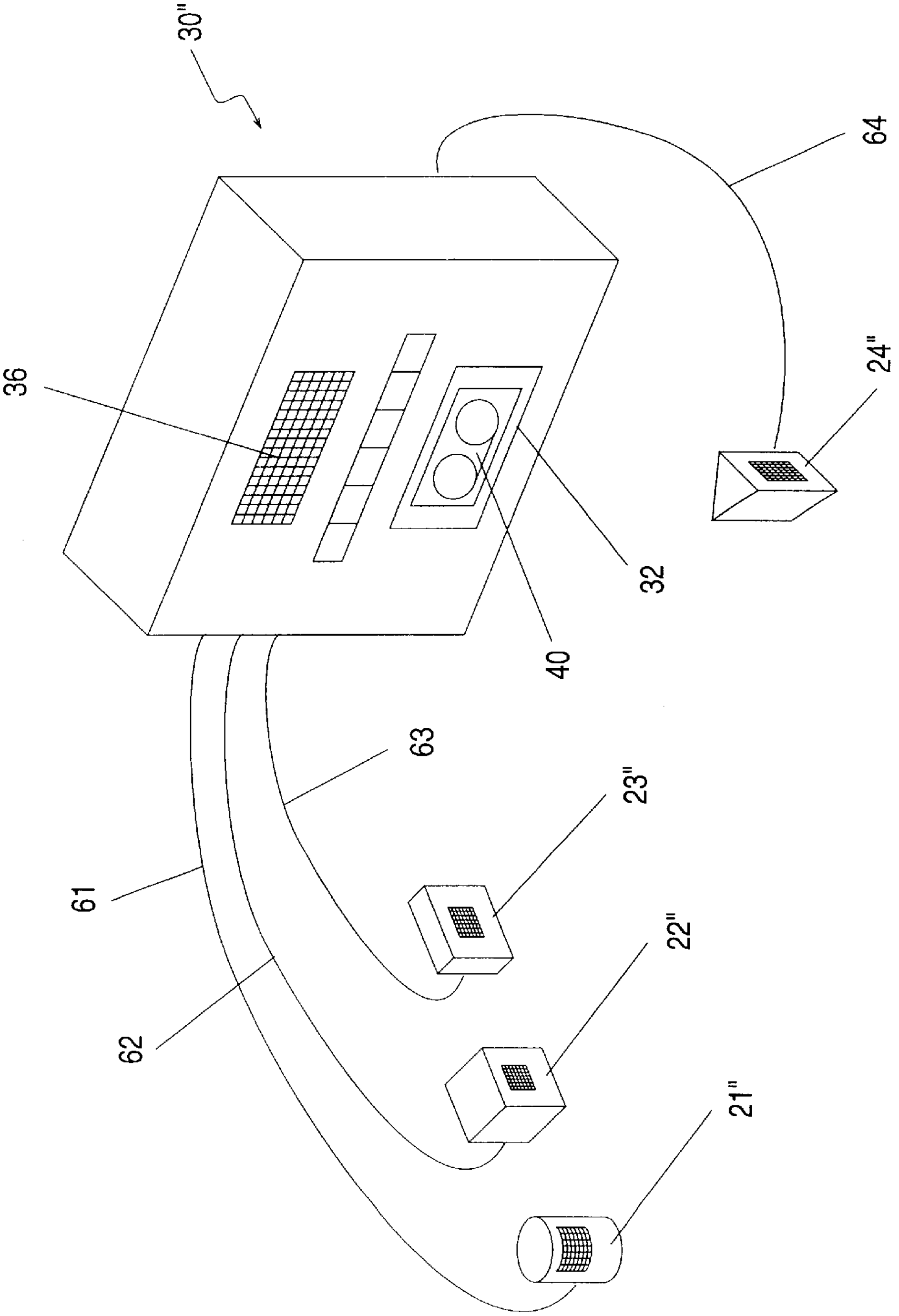
FIG. 8 is a perspective view of a third embodiment of the present invention.
Figure 9:
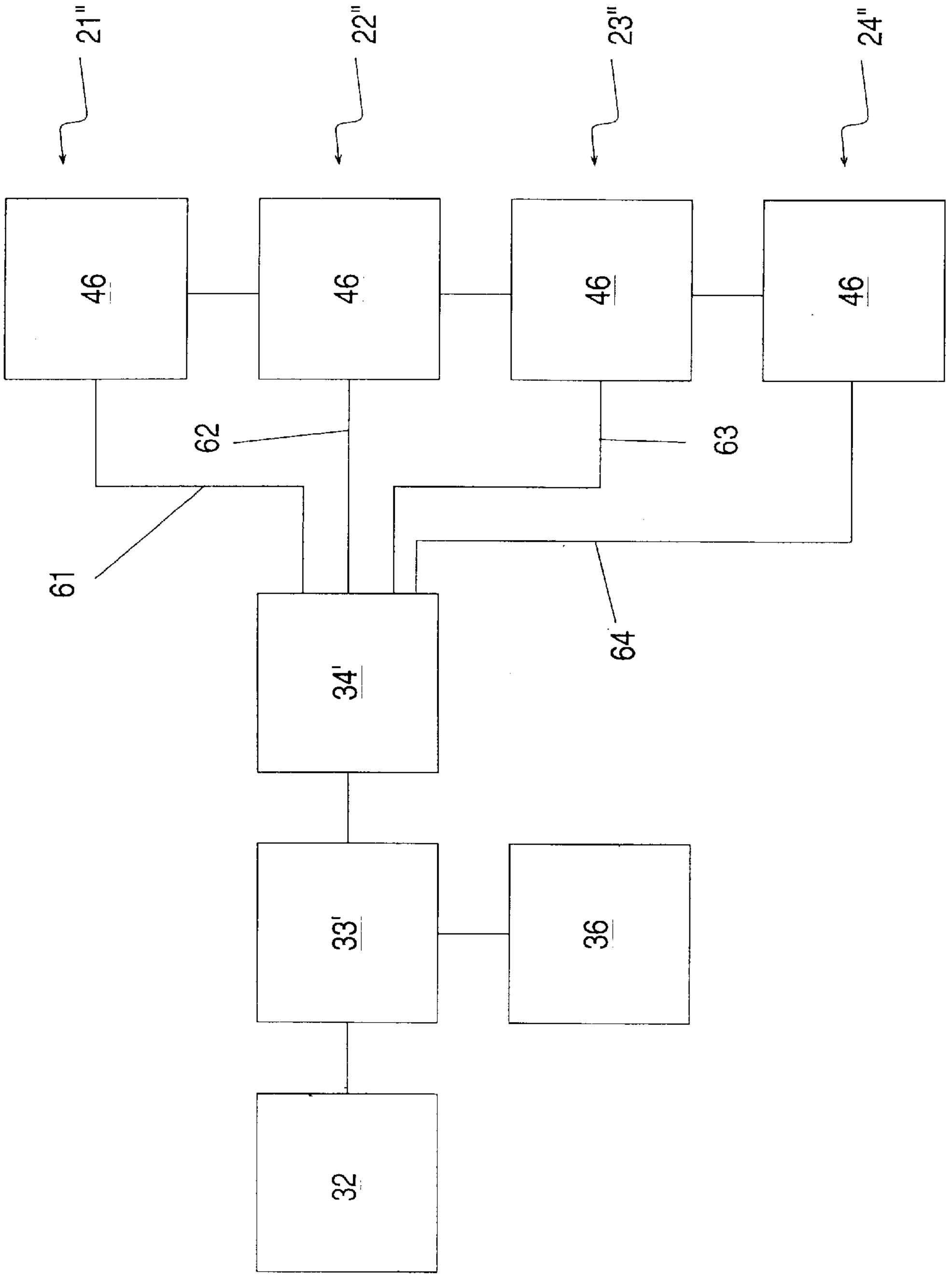
FIG. 9 is a block diagram of the system of FIG. 8.

FIG. 8 is a perspective view of a third preferred embodiment of the present invention, in which a base unit 30" is connected separately to remote units 21", 22", 23" and 24" by separate lines 61, 62, 63 and 64 respectively. Appropriate circuitry in base unit 30" sends blocks of audio data only to the remote units that are to broadcast them. FIG. 9 is a block diagram of base unit 30" and remote units 21" 22", 23" and 24'. Note that in this case, the only functional components of the remote units are audio speakers 46. Blocks of audio data from cassette tape player 32 are sent to circuitry 33' that reads the identification code of each block. As before, a block having an identification code associating it with base unit 30" is broadcast by speaker 36. A block havino an identification code associating it with a remote unit is directed to the appropriate remote unit by a selector switch 34'. Of course, under this moditication, audio speakers 46 are always "on".

Figure 10:
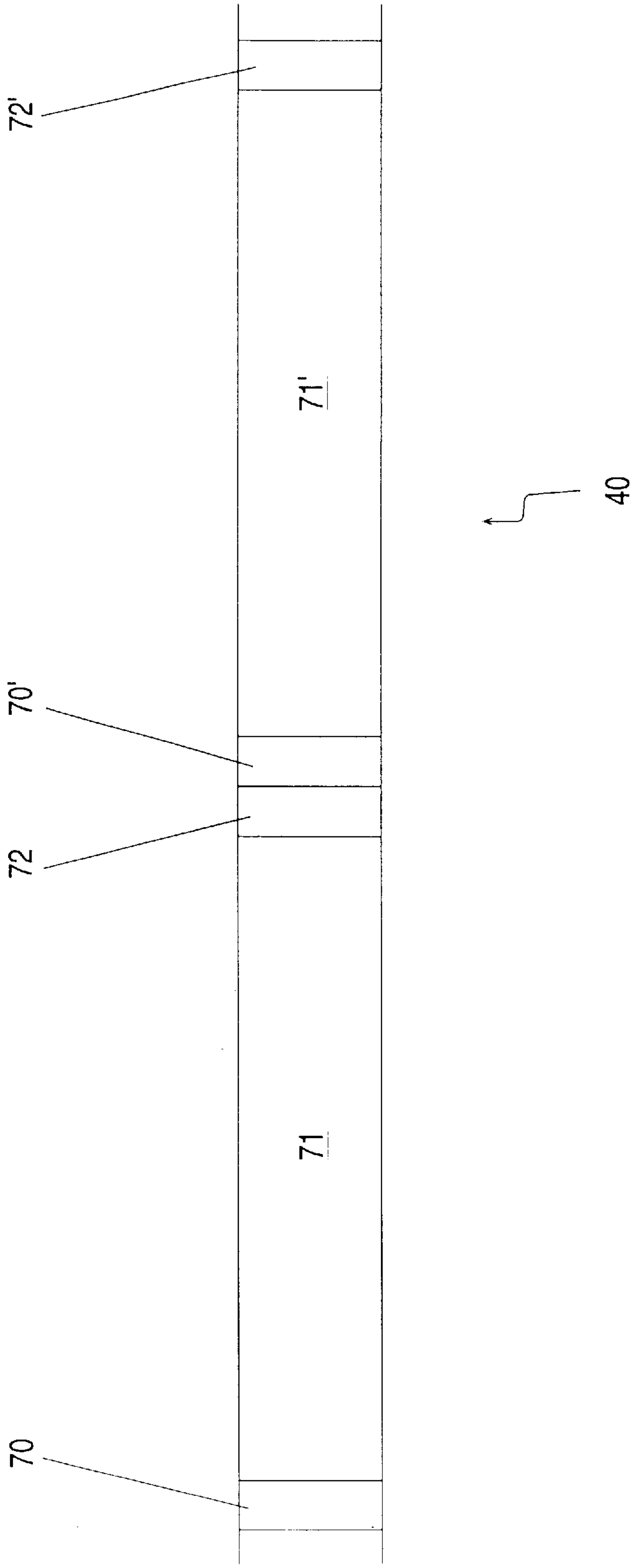
FIG. 10 shows blocks of audio data in which the identification codes are in the form of DTMF preambles.

Many methods may be used to flag the blocks of audio data to indicate which blocks are to be broadcast by base unit 30 and which blocks are to be broadcast by each of remote units 21, 22, 23, or 24. One such method is based on "dual tone multi frequency" (DTMF) coding that is widely used in telephone systems. The identification codes are pairs of audio tones, selected from a group of eight audio tones, so that sixteen unique codes may be defined. Thhe codes are provided as short (for example, 30 milliseconds long) preambles to the blocks of audio data on cassette tape 40, as shown in FIG. 10, which shows two blocks 71 and 71' of audio data. Data block 71 is preceded by a preamble 70. Data block 71' is preceded by a preamble 70'. In addition, blocks 71 and 71' are followed by postambles 72 and 72'. respectively. that indicate the end of the respective data block. Postambles 72 and 72'may be, for example short (e.g., 300 millisecond) periods of silence. This method is particularly useful in combination with the identification code matching method illustrated in FIG. 3. Because the initial state of all remote audio speakers 46 is "off", preambles 70 and 70' are not broadcast, despite being otherwise indistinguishable from audio data blocks 71 and 71'.

An alternative method of flagging the audio data blocks exploits the fact that the useful frequencies of speech are below 8 kilohertz. In this method audio data blocks intended for broadcast by the remote units are encoded with identification codes in the form of high frequency sinusoids. For example, a 9 kilohertz frequency sinusoid may be superposed on audio data blocks intended for remote unit 21, a 10 kilohertz frequency sinusoid may be superposed on audio data blocks intended for remote unit 22, an 11 kilohertz frequency sinusoid may be superposed on audio data blocks intended for remote unit 23, and a 12 kilohertz frequeney sinusoid may be superposed on audio data blocks intended for remote unit 24. Under this scheme, the absence of a signal at frequencies higher than 8 kilohertz in a block of audio data indicates that that block is to be broadcast by base unit 30. Circuitry 33 is provided with a mechanism including a high pass filter for detecting frequencies higher than 8 kilohertz. When frequencies higher than 8 kilohertz are detected by circuitry 33, circuitry 33 turns off base audio speaker 36. When frequencies higher than 8 kilohertz are not detected by circuitry 33, circuitry 33 turns on base audio speaker 36. Similarly, circuitry 44 of remote units 21, 22, 23, and 24 is provided with mechanisms including bandpass filters for detecting the remote unit identification frequencies. For example, remote unit 21 may be provided with a filter with a pass band from 8.5 kilohertz and 9.5 kilohertz. When circuitry 44 of remote unit 21 detects frequencies in that pass band, circuitry 44 of remote unit 21 turns on audio speaker 46 of remote unit 21. When circuitry 44 of remote unit 21 does not detect frequencies in that pass band, circuitry 44 of remote unit 21 leaves audio speaker 46 of remote unit 21 turned off. Similarly, remote unit 22 may be provided with a filter with a pass band from 9.5 kilohertz to 10.5 kilohertz, remote unit 23 may be provided with a filter with a pass band from 10.5 kilohertz to 11.5 kilohertz, and remote unit 24 may be provided with a filter with a pass band from 11.5 kilohertz to 12.5 kilohertz.

While the invention has been described with respect to a limited number of embodiments, it will be appreciated that many variations, modifications and other applications of the invention may be made.

What is claimed is:

1. A storytelling system comprising:

(a) a data storage medium, whereon is pre-stored a plurality of blocks of audio data, each of said blocks of audio data being flagged with an identification code;

(b) a transmission mechanism for transmitting said blocks of audio data;

(c) at least one remote unit, featuring a mechanism for receiving said transmitted blocks of audio data and broadcasting said blocks of audio data as audible sound; and (d) a selection mechanism for selecting one of said at least one remote unit to broadcast at least one of said blocks of audio data, in accordance with said identification code.

2. The system of claim 1, wherein said selection mechanism is operationally connected to said transmission mechanism.

3. The system of claim 1, wherein said selection mechanism is operationally connected to, and distributed among, said at least one remote unit.

4. The system of claim 1, wherein said transmission mechanism is based on a transmission medium selected from the group consisting of radio, ultrasound and infrared.

5. The system of claim 1, wherein said transmission mechanism includes at least one electrically conductive wire connecting to one of said at least one remote unit.

6. The system of claim 1, wherein said data storable medium includes at least one audio cassette tape.

7. The system of claim 1, wherein said data storage medium includes at least one compact disk.

8. The system of claim 1, wherein each of said blocks of audio data includes a preamble wherein said identification code is stored.

9. The system of claim 8, wherein said identification code is encoded as a DTMF code.

10. The system of claim 8, wherein each of said blocks of audio data includes a postamble.

11. The system of claim 1, wherein said identification code is superposed on said block of audio data.

12. The system of claim 1, further comprising:

(e) a mechanism for reading said blocks of audio data from said data storage medium and transferring said blocks of audio data to said transmission mechanism.

13. The system of claim 12, wherein said mechanism for reading said blocks of audio data includes a device selected from the group consisting of audio cassette players and compact disk players.

14. The system of claim 12, wherein said mechanism for reading said blocks of audio data is reversibly detachable from said transmission mechanism.

15. The system of claim 1, wherein each of said at least one remote unit has a unique unit identifying feature, the system further including at least one doll, each of said at least one doll having a unique doll identifying feature matching said unique unit identifying feature.

16. The system of claim 15, wherein said at least one unit identifying feature and said at least one doll identifying feature are matching colors.

17. The system of claim 15, wherein said at least one unit idenitifying feature and said at least one doll identifying feature are matching shapes.

18. A storytelling system comprising:

(a) a data storage medium, whereon is stored a plurality of blocks of audio data, each of said blocks of audio data being flagged with an identification code;

(b) a transmission mechanism for transmitting said blocks of audio data;

(c) at least one remote unit, featuring a mechanism for receiving said transmitted blocks of audio data and broadcasting said blocks of audio data as audible sound; and (d) a selection mechanism for selecting one of said at least one remote unit to broadcast at least one of said blocks of audio data, in accordance with said identification code; and (e) a base unit, operationally connected to said transmission mechanism and including a mechanism for broadcasting said blocks of audio data as audible sound; said selection mechanism also selecting said base unit to broadcast at least one of said blocks of audio data, in accordance with said identification code.

19. A storytelling system comprising:

(a) a read-only data storage medium, whereon is stored a plurality of blocks of audio data, each of said blocks of audio data being flagged with an identification code;

(b) a transmission mechanism for transmitting said blocks of audio data;

(c) at least one remote unit, featuring a mechanism for receiving said transmitted blocks of audio data and broadcasting said blocks of audio data as audible sound; and (d) a selection mechanism for selecting one of said at least one remote unit to broadcast at least one of said blocks of audio data, in accordance with said identification code.

20. The system of claim 19, wherein said read-only data storage medium includes at least one compact disk.

21. A storytelling system comprising:

(a) a data storage medium, whereon is stored a plurality of blocks of audio data, each of said blocks of audio data being flagged with an identification code;

(b) a transmission mechanism for transmitting said blocks of audio data;

(c) at least one remote unit, featuring a mechanism for receiving said transmitted blocks of audio data and broadcasting said blocks of audio data as audible sound, said data storage medium being located apart from said at least one remote unit; and (d) a selection mechanism for selecting one of said at least one remote unit to broadcast at least one of said blocks of audio data, in accordance with said identification code.

22. A storytelling system comprising:

(a) a data storage medium, whereon is stored a plurality of blocks of audio data, each of said blocks of audio data including an identification code;

(b) a transmission mechanism for transmitting said blocks of audio data;

(c) at least one remote unit, featuring a mechanism for receiving said transmitted blocks of audio data and broadcasting said blocks of audio data as audible sound; and (d) a selection mechanism for selecting one of said at least one remote unit to broadcast at least one of said blocks of audio data, in accordance with said identification code.

* * * * *